US012809362B2

(12) United States Patent
Kobayashi

(10) Patent No.: US 12,809,362 B2
(45) Date of Patent: Nov. 24, 2026

(54) DIAGNOSTIC TOOL HAVING HUMAN-MACHINE INTERFACE, AND METHOD FOR DIAGNOSIS OF PROGRAMMABLE LOGIC CONTROLLER

(71) Applicant: ASM IP Holding, B.V., Almere (NL)

(72) Inventor: Wataru Kobayashi, Sagamihara (JP)

(73) Assignee: ASM IP Holding B.V., Almere (NL)

( * ) Notice: Subject to any disclaimer, the term of this patent is extended or adjusted under 35 U.S.C. 154(b) by 334 days.

(21) Appl. No.: 18/328,398

(22) Filed: Jun. 2, 2023

(65) Prior Publication Data

US 2023/0393569 A1 Dec. 7, 2023

Related U.S. Application Data

(60) Provisional application No. 63/349,232, filed on Jun. 6, 2022.

(51) Int. Cl.
*G05B 19/05* (2006.01)
*G05B 23/02* (2006.01)
*G06F 1/16* (2006.01)

(52) U.S. Cl.
CPC ....... *G05B 23/0224* (2013.01); *G05B 19/058* (2013.01); *G06F 1/1601* (2013.01); *G05B 23/02* (2013.01); *G05B 23/0267* (2013.01); *G05B 2219/14006* (2013.01); *G05B 2219/14008* (2013.01); *G05B 2223/06* (2018.08); *G06F 1/1628* (2013.01)

(58) Field of Classification Search
CPC .............. G05B 23/0224; G05B 19/058; G05B 2219/14006; G05B 2223/06; G05B 23/0272; G05B 19/409; G05B 23/0216; G05B 2219/14084
See application file for complete search history.

(56) References Cited

U.S. PATENT DOCUMENTS

| | | | | | |
|---|---|---|---|---|---|
| 5,245,220 | A * | 9/1993 | Lee | H02M 1/10 | 363/37 |
| 7,117,043 | B1 * | 10/2006 | Frederick | G05B 19/056 | 715/255 |
| 2004/0162996 | A1 * | 8/2004 | Wallace | H04L 63/104 | 726/1 |
| 2006/0235637 | A1 * | 10/2006 | Brayton | G01R 31/2848 | 702/113 |
| 2012/0083906 | A1 * | 4/2012 | Weatherhead | G05B 23/0267 | 700/83 |
| 2014/0074286 | A1 * | 3/2014 | Geheb | B25J 9/1674 | 700/245 |

(Continued)

OTHER PUBLICATIONS

Pelican laptop hard cases, product listing, 2021, taken from archive. org URL:<https://web.archive.org/web/20210301141301/https://www.pelican.com/us/en/products/cases/laptop-cases/> (Year: 2021).*

(Continued)

*Primary Examiner* — Jonathan Michael Skrzycki
(74) *Attorney, Agent, or Firm* — Banner & Witcoff, Ltd.

(57) ABSTRACT

Examples of a diagnostic tool include a LAN port, a human-machine interface (HMI), and a CPU configured to transmit a command issued from the HMI by a user to a connection destination of the LAN port, wherein the diagnostic tool is configured to be incapable of wireless communication.

9 Claims, 11 Drawing Sheets

(56) References Cited

U.S. PATENT DOCUMENTS

| | | | | |
|---|---|---|---|---|
| 2015/0356220 | A1* | 12/2015 | Southerland | G05B 19/05 703/15 |
| 2018/0011467 | A1* | 1/2018 | Murayama | H04B 3/54 |
| 2019/0317735 | A1* | 10/2019 | Duan | G06F 8/34 |
| 2022/0287681 | A1* | 9/2022 | Joseph | A61B 8/461 |
| 2022/0390934 | A1* | 12/2022 | Higashiya | G05B 23/0216 |

OTHER PUBLICATIONS

Quora, Buster Ecks, "Is there a way to permanently uninstall wifi capabilities on my laptop?" 2018, URL:<https://www.quora.com/Is-there-a-way-to-permanently-uninstall-wifi-capabilities-on-my-laptop> (Year: 2017).*

Miami Law Information Technology, "Saving files to a USB drive", May 6, 2022, taken from archive.org URL:<https://web.archive.org/web/20220506222446/https://media.law.miami.edu/it/pdf/faq/back-up-instructions.pdf> (Year: 2022).*

Amatrol, "Portable PLC Troubleshooting Learning System—Allen Bradley CompactLogix", 2020, taken online wayback machine URL:<https://web.archive.org/web/20200901000000*/https://buckeye-edu.com/wp-content/uploads/2017/07/990-PAB53F.pdf> (Year: 2020).*

* cited by examiner

DIAGNOSTIC TOOL HAVING HUMAN-MACHINE INTERFACE, AND METHOD FOR DIAGNOSIS OF PROGRAMMABLE LOGIC CONTROLLER

FIELD

Examples are described which relate to a diagnostic tool having a human-machine interface (HMI) and a method for diagnosis of a programmable logic controller (PLC).

BACKGROUND

For example, in a semiconductor manufacturing apparatus such as a film forming apparatus and an etching apparatus, a controller that is called a PLC is used to control equipment or grasp a state of the equipment. The PLC controls equipment such as a motor and a lamp by reading input information from, for example, a sensor or a switch and executing a program.

In a system in which various kinds of equipment are linked to operate with the PLC, a safety PLC is used so that the system complies with international safety standards (18013849 and IEC61508). The safety PLC is a controller that secures safety of workers at a semiconductor manufacturing site.

After a semiconductor manufacturing apparatus is assembled at a manufacturing factory, I/O check related to the PLC is performed using PLC development software. The PLC development software is dedicated application for creating a program and is difficult to be dealt with without expertise. If an inexperienced person uses the PLC development software and tries to perform I/O check related to the PLC, it may take, for example, approximately one week.

Further, once a semiconductor manufacturing apparatus is delivered to a customer's factory, a personal computer in which a PLC development tool is installed is not permitted to be brought into the customer's factory due to security policy of the customer's factory. In this case, in a case where the PLC of the semiconductor manufacturing apparatus issues an alarm at the customer's factory, it is difficult to quickly solve the problem without the PLC development tool. According to one example, it takes several days to several months to solve the problem.

SUMMARY

Some examples described herein may address the above-described problems. Some examples described herein may provide a diagnostic tool capable of easily diagnosing a semiconductor manufacturing apparatus and a method for diagnosis.

In some examples, a diagnostic tool includes a LAN port, a human-machine interface (HMI), and a CPU configured to transmit a command issued from the HMI by a user to a connection destination of the LAN port. The diagnostic tool is configured to be incapable of wireless communication.

DETAILED DESCRIPTION

Figure 1:
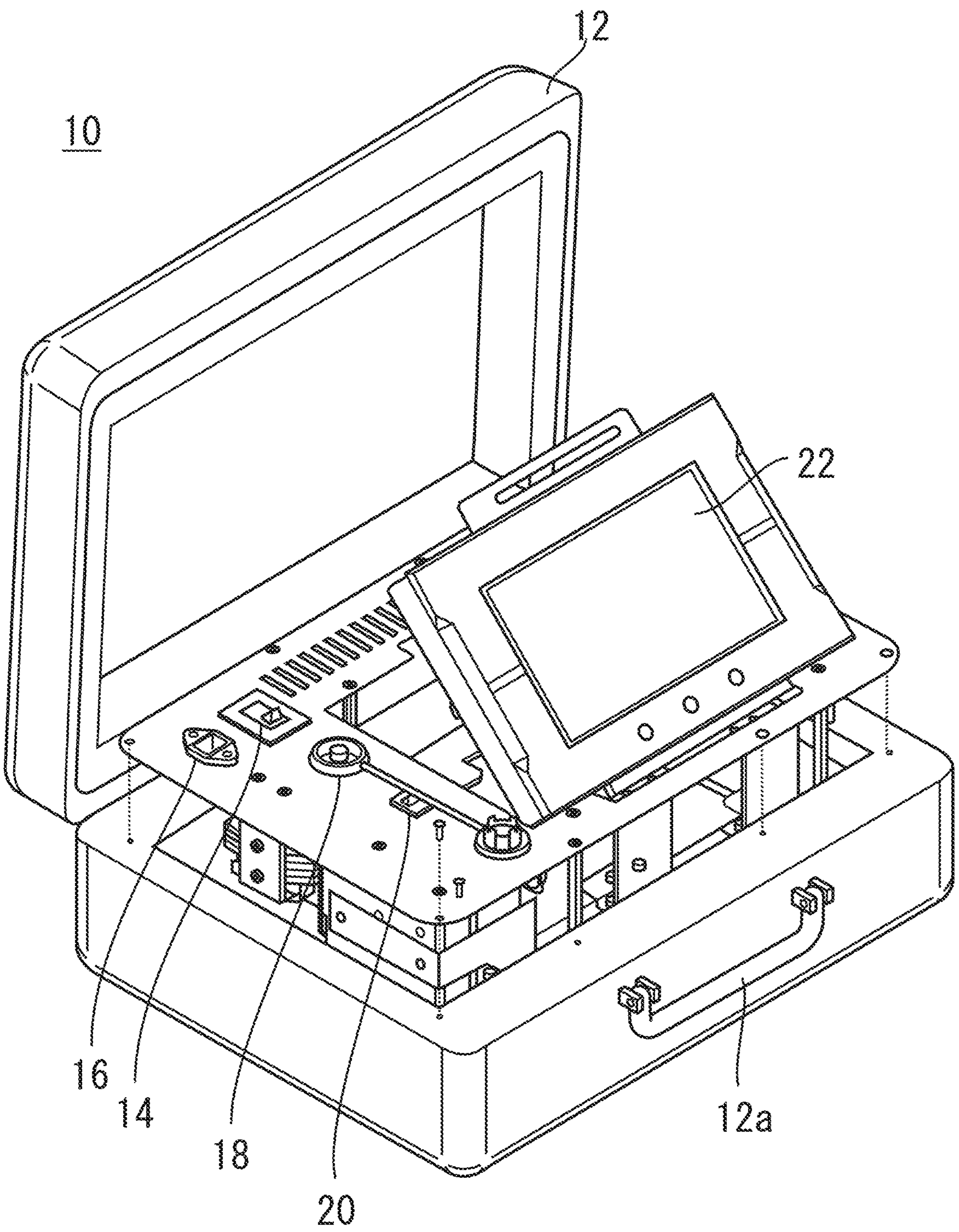
FIG. 1 is a perspective view of a diagnostic tool.

A diagnostic tool and a method for diagnosis will be described with reference to the drawings. There is a case where the same reference numerals will be assigned to the same or corresponding components, and repetitive description will be omitted. Note that there is a case where simple description of the PLC may indicate both the PLC and the safety PLC.

FIG. 1 is a perspective view of a diagnostic tool 10 according to an embodiment. According to one example, the diagnostic tool 10 includes an attaché case 12. The attaché case 12 includes a handle 12*a*, which allows a worker to easily carry the attaché case 12. According to one example, the diagnostic tool 10 includes a power supply switch 14 and an AC power supply receptacle 16. According to one example, the AC power supply receptacle 16 can be used as an international electrotechnical commission (IEC) connector for power supply. This enables easy connection to power supplies in each country by only preparing a cable complying with specifications in each country.

According to one example, the diagnostic tool 10 includes a USB port 18 and a LAN port 20. Further, the diagnostic tool 10 includes an HMI 22. According to one example, the HMI 22 is a touch panel. According to one example, an angle of the touch panel can be adjusted in multiple steps into an angle at which a user can easily view the touch panel. According to another example, the HMI includes a display, a mouse and a keyboard. The USB port 18 described above is, for example, configured to allow storage of data displayed at the HMI 22 in a USB memory which is an external memory. Specifically, the data displayed at the HMI 22 can be stored in the USB memory through operation of the HMI 22 by the USB port 18 being connected to the HMI 22 with wiring. By storing the data in the USB memory, the data can be provided to an engineer outside the factory, and technical advice can be received from the engineer.

According to one example, the diagnostic tool 10 in FIG. 1 is configured to be incapable of wireless communication. In other words, the diagnostic tool 10 does not have a wireless communication function. As a result of a wireless communication function being not provided, the diagnostic tool 10 can be brought into a customer's factory.

Figure 2:
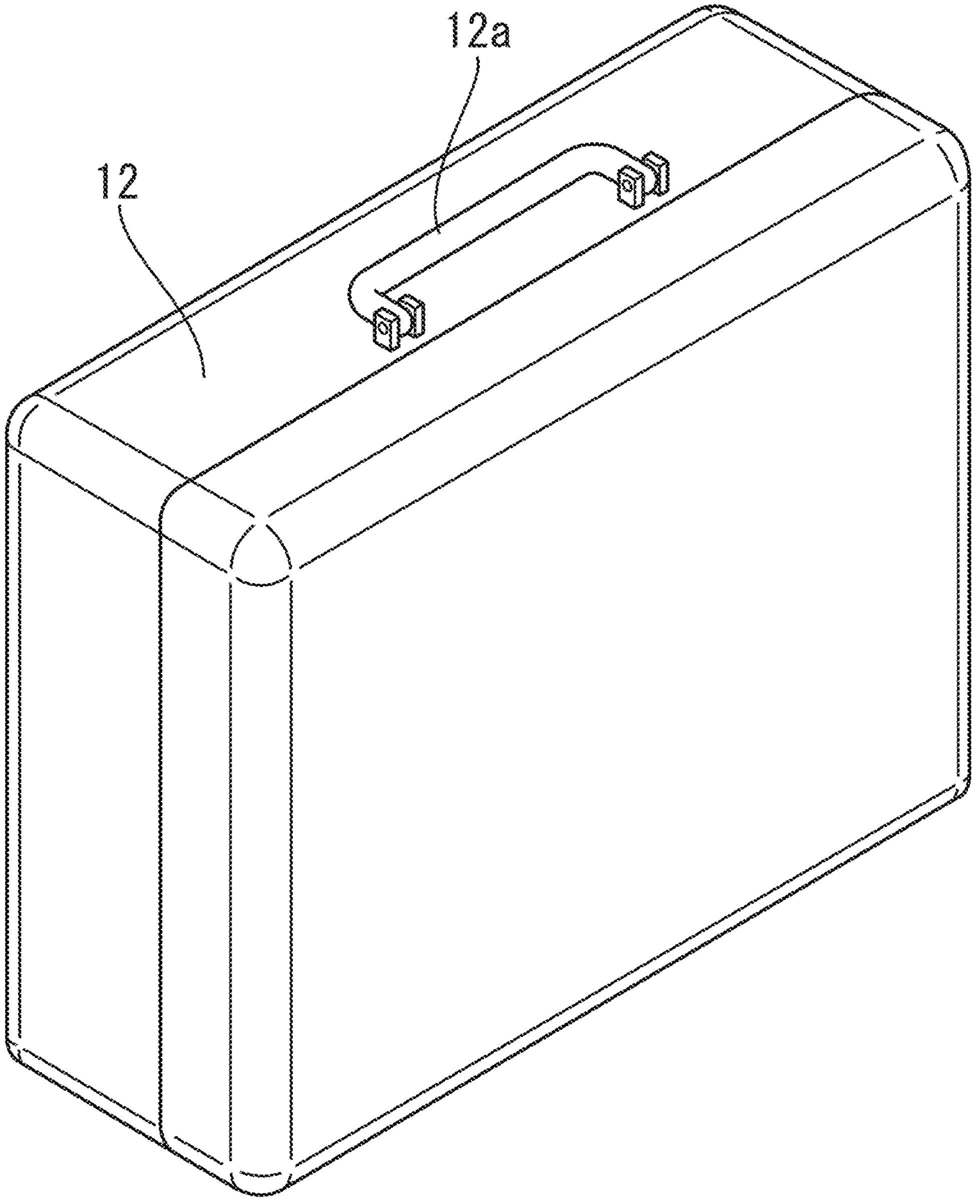
FIG. 2 is a perspective view of the attaché case in a closed state.

FIG. 2 is a perspective view of the attaché case 12 in a closed state. In the attaché case 12, for example, the LAN port 20, the HMI 22, a CPU, and the like, are accommodated. According to one example, a total weight of the attaché case 12 and all apparatuses inside the attaché case 12 is made equal to or less than 10 kg, so that a worker can easily carry the attaché case 12 with the handle 12*a*.

Figure 3A:
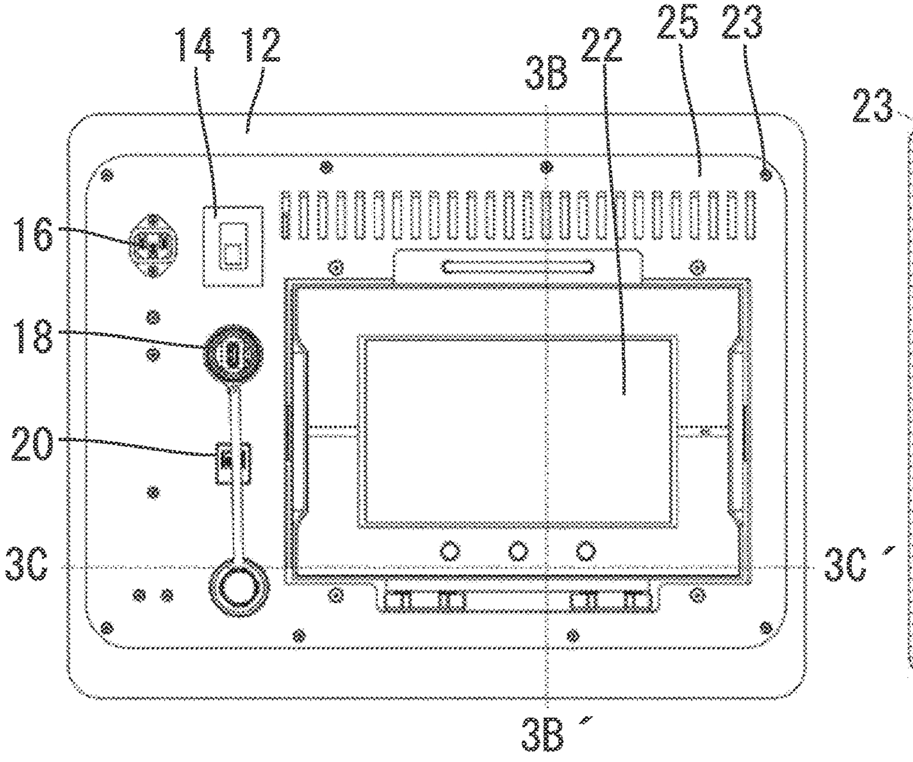
FIG. 3A is a plan view of inside of the attaché case.

FIG. 3A is a plan view of inside of the attaché case 12. For example, the HMI 22 is a touch panel of approximately 9 inches. According to one example, the HMI 22, the power supply switch 14, the AC power supply receptacle 16, the USB port 18 and the LAN port 20 are attached to one mounting board 25. Then, the mounting board 25 is fixed to the attaché case 12 with a plurality of screws 23.

Figure 3B:
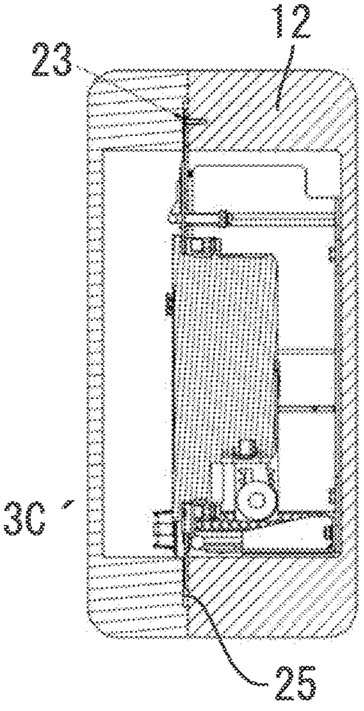
FIG. 3B is a cross-sectional diagram of the attaché case.

FIG. 3B is a cross-sectional diagram on a line 3B-3B' in FIG. 3A. The mounting board 25 is fixed to the attaché case 12 by the screws 23 being fastened to thread grooves provided at the attaché case 12.

Figure 3C:
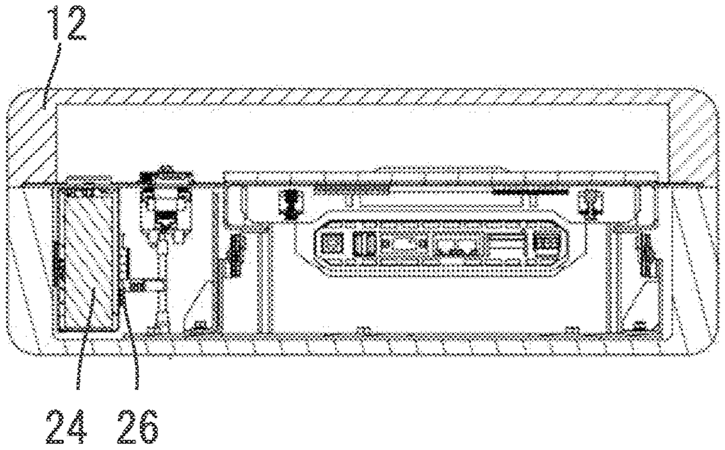
FIG. 3C is a cross-sectional diagram of the attaché case.

FIG. 3C is a cross-sectional diagram on a line 3C-3C' in FIG. 3A. FIG. 3C illustrates a DC power supply apparatus 24. The DC power supply apparatus 24 enables power supply to the HMI 22, and the like. The DC power supply apparatus 24 is, for example, an AC-DC conversion circuit that supports an input voltage from to 265 V. Further, a fuse 26 is connected to the power supply apparatus 24.

Figure 4:
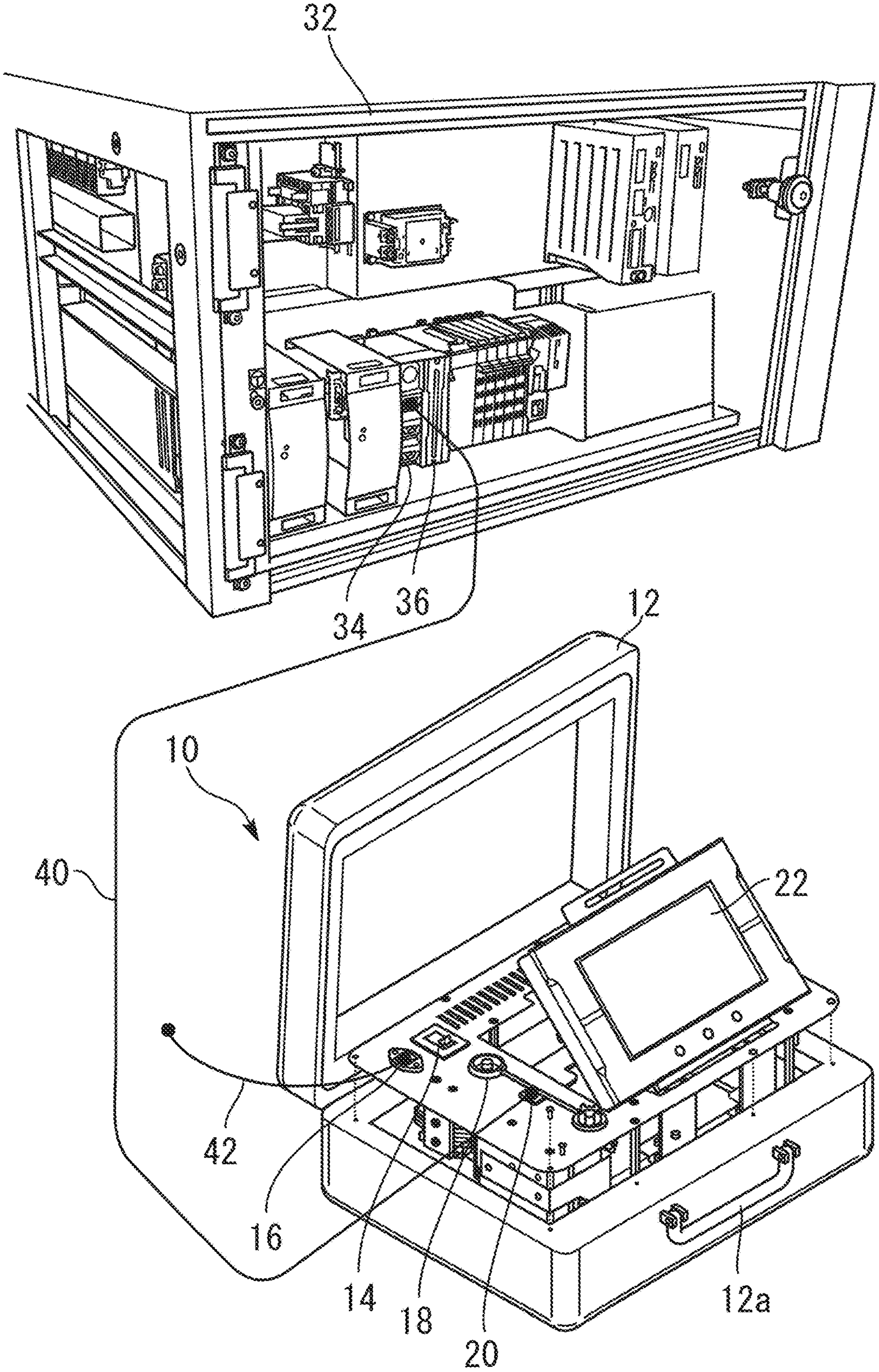
FIG. 4 is a view illustrating a connection example of the diagnostic tool.

FIG. 4 is a view illustrating a connection example of the diagnostic tool 10. As illustrated in FIG. 4, the HMI 22 becomes available by connecting a power supply cable 42 to the AC power supply receptacle 16. According to one example, the power supply cable 42 is connected to a power supply of an AC 85 to 264 V and equal to or less than 2 A. According to one example, a memory that stores a program is attached to a back side or inside of the HMI 22.

For example, an Ethernet cable 40 connects the LAN port 20 and a PLC 34. A safety PLC 36 is disposed next to the PLC 34. According to one example, the PLC 34, the safety PLC 36 and other apparatuses are accommodated in an ELEC BOX 32. The safety PLC 36 is connected to the PLC 34, so that the PLC 34 and the safety PLC 36 can be connected to the diagnostic tool 10 with one Ethernet cable 40. According to one example, the PLC 34 can be connected to the HMI 22 using a hot connect function via the Ethernet cable 40. By connection using the hot connect function, the diagnostic tool 10 can start a diagnosis by connecting the Ethernet cable to the PLC 34 or the Ethernet cable 40 can be unplugged from the PLC 34 without turning off power of the PLC 34 and the safety PLC 36. Thus, the connection using the hot connect function enables execution of respective kinds of processing which will be described later by connecting the diagnostic tool 10 to the PLC in a state where an alarm is detected without turning off power of the PLC.

Figure 5:
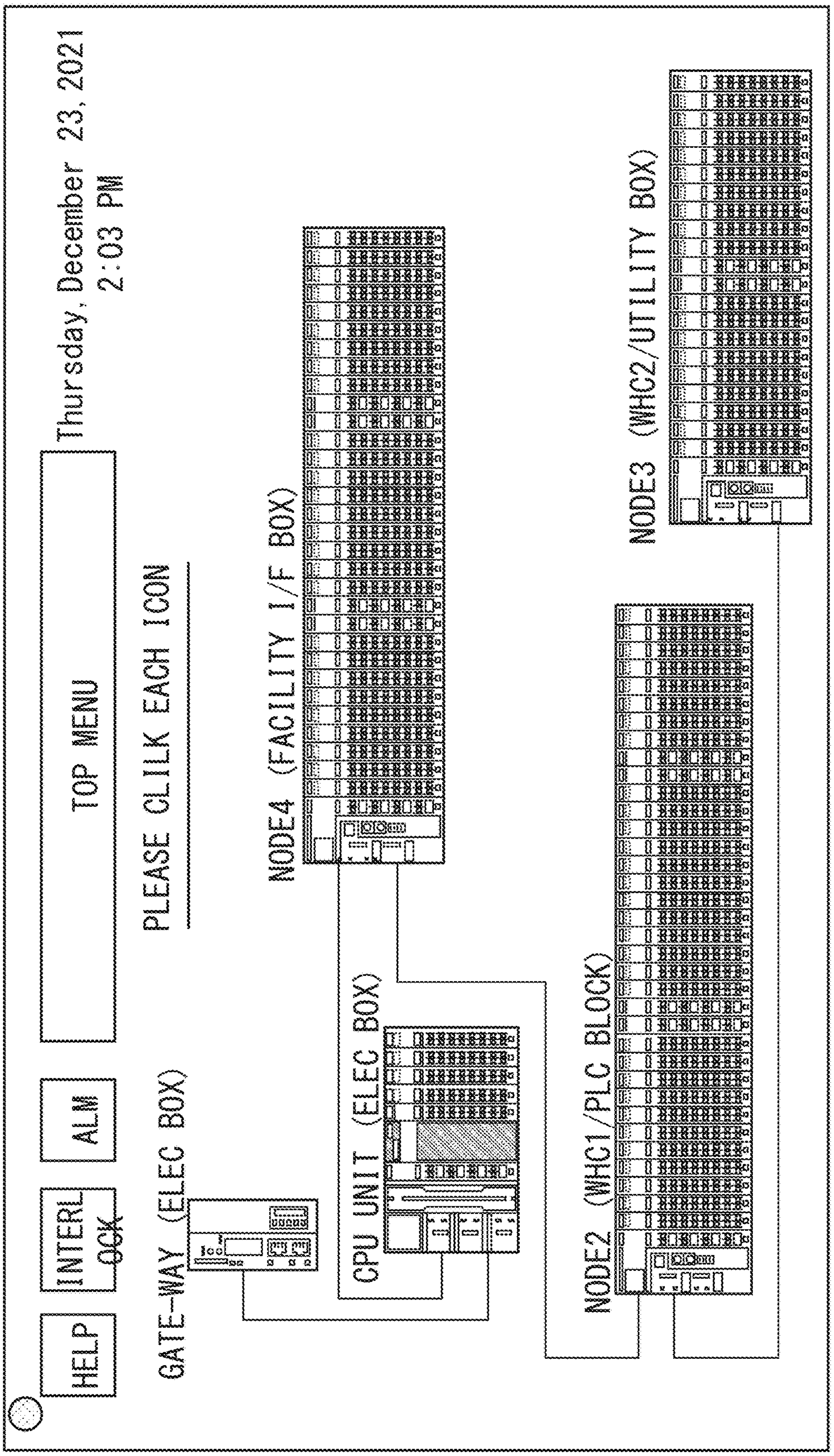
FIG. 5 illustrates one CPU unit, and NODEs connected as slaves.

FIGS. 5 to 10 are examples of a screen to be displayed at the HMI 22. First, the diagnostic tool 10 is connected to the PLC 34. Then, a top menu screen in FIG. 5 is displayed at the HMI 22. According to one example, the top menu screen is a configuration screen including the PLC and equipment connected to the PLC. In other words, the top menu screen is a configuration screen of equipment incorporated into an apparatus to be diagnosed. FIG. 5 illustrates one CPU unit, and NODEs 2, 3, 4 connected as slaves. According to one example, by the user touching one of the equipment displayed on the screen in FIG. 5, a state of I/O of the touched equipment can be displayed at the HMI 22.

Figure 6:
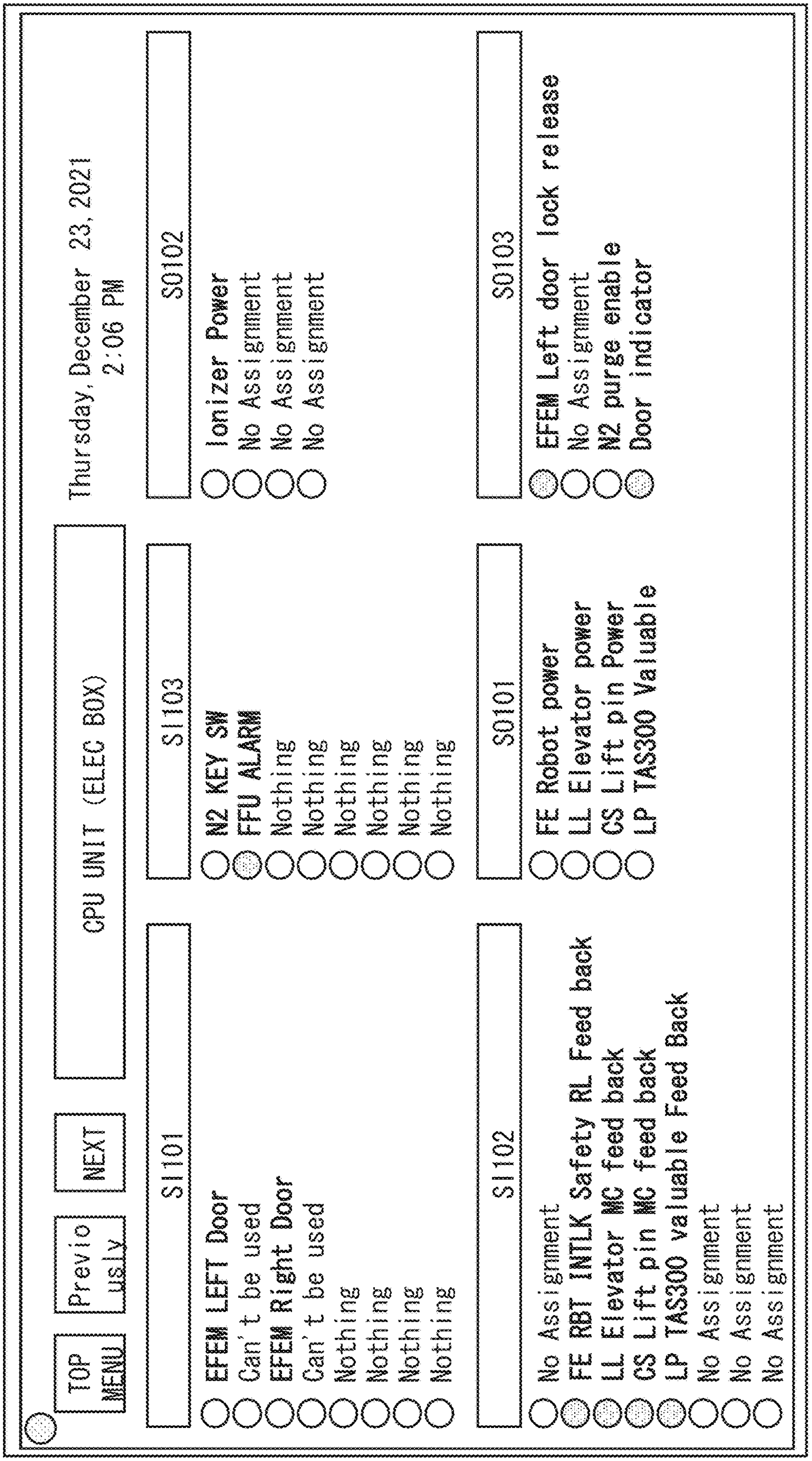
FIG. 6 shows I/O of the equipment connected to the CPU unit.

For example, when the user touches CPU UNIT (ELEC BOX) in FIG. 5, the screen in FIG. 6 is displayed at the HMI 22. In FIG. 6, I/O of the equipment connected to the CPU unit is displayed. In a unit of SI101, buttons of Equipment Front End Module (EFEM) LEFT DOOR and EFEM RIGHT DOOR are not displayed in green, and thus, it can be understood that these sensors are in an OFF state.

It can be seen from a unit in SI103 that a sensor of N2 KEY SW for which a button is not displayed in green is in an OFF state, and a sensor of Fan Filter Unit (FFU) ALARM for which a button is displayed in green is in an ON state. In this manner, each of SI101, SI102, SI103, SO101, SO102 and SO103 becomes one unit, and ON/OFF states of sensors in each unit can be confirmed.

In this manner, by selecting the PLC or the equipment displayed on the configuration screen, a state of the PLC or the equipment can be displayed. In other words, an internal state of the PLC can be displayed at the HMI 22. The diagnostic tool 10 is configured to display an internal state of the PLC connected to the LAN port at the HMI 22. According to one example, the internal state of the PLC can be confirmed only by connecting the diagnostic tool 10 to the PLC with the Ethernet cable. Note that the equipment to be connected to the PLC includes, for example, at least one of a sensor, a switch, a motor or a lamp. In this case, the PLC controls the motor or the lamp by reading information of the sensor or the switch and executing a program determined in advance.

According to one example, a button (hereinafter, referred to as a hidden button) that is invisible to the user can be provided on the configuration screen in FIG. 5. The hidden button is a button for forcedly performing operation performed at the PLC. By making the hidden button a button that is invisible to the user, it is possible to prevent such forced operation from being easily executed. A person who knows existence of the hidden button by a manual, or the like, can forcedly operate the equipment by depressing the hidden button on the touch panel.

For example, a "hidden button that exists at the HMI and is invisible to the user" is disposed in an upper right region within the configuration screen in FIG. 5. A forced operation screen for forcedly operating the equipment connected to the PLC can be displayed by the user depressing this hidden button using a method determined in advance. According to one example, by making settings such that the screen transitions to the forced operation screen only in a case where the hidden button is successively depressed a predetermined number of times, it is possible to prevent the screen from easily transitioning to the forced operation screen. According to another example, the screen can transition to the forced operation screen only by a plurality of hidden buttons being depressed in order determined in advance. By a method for operating the hidden button being stored as procedures, the user can refer to the procedures as necessary.

Figure 7:
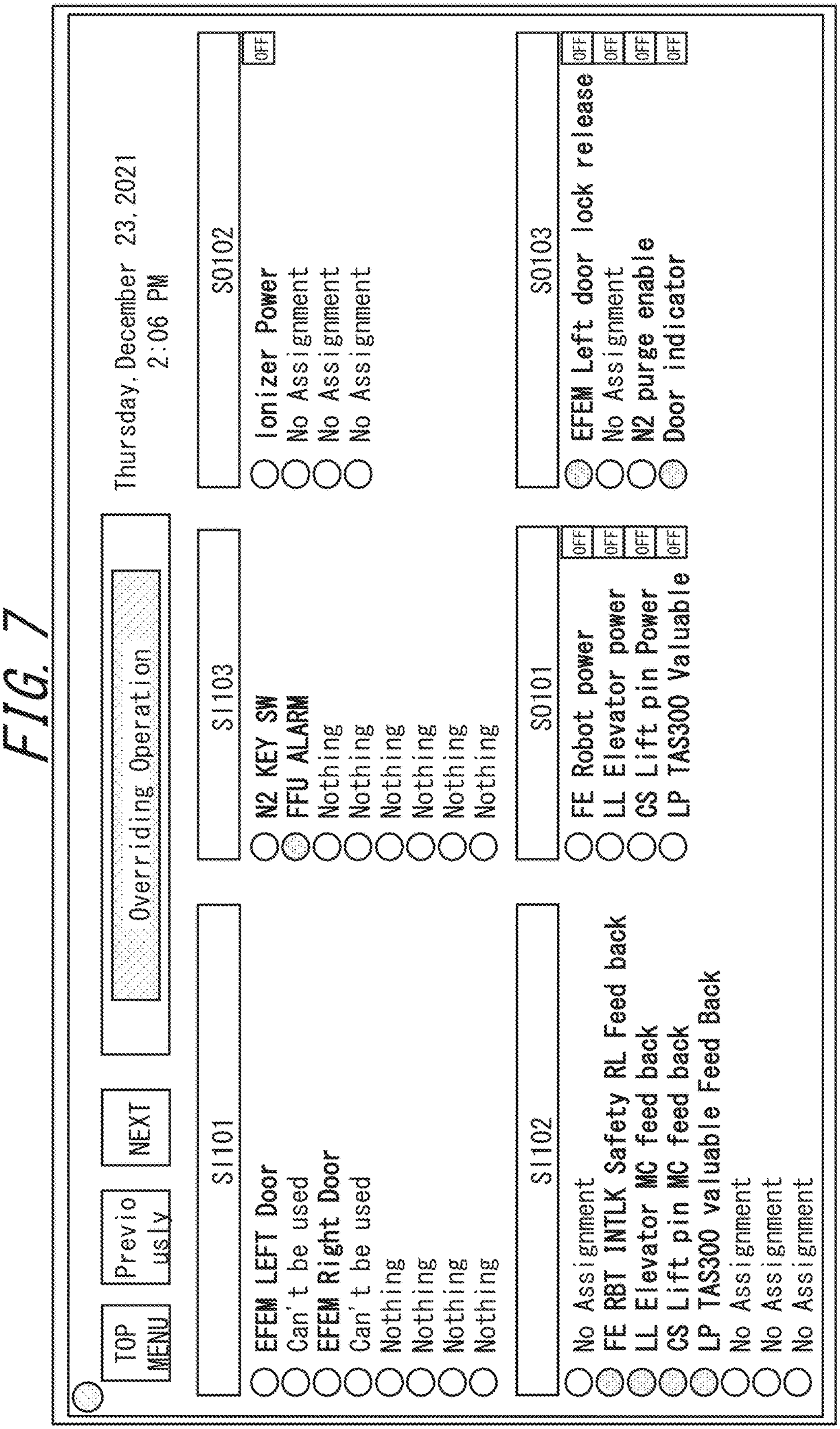
FIG. 7 is a view illustrating an example of the forced operation screen.

FIG. 7 is a view illustrating an example of the forced operation screen. The user can forcedly operate the equipment by operating the forced operation screen. For example, the user can forcedly operate the equipment by touching part of the forced operation screen. Examples of the forced operation are as follows.

- Light an LED, which is not lighted unless an error occurs, by depressing a button on the forced operation screen even if an error does not occur.
- Forcedly move a gate valve (GV). For example, open/close the GV to confirm operation when the apparatus is assembled.
- Open an EFEM door in a state where a robot operates in the EFEM. Normally, opening of the EFEM door while the robot is operating is not allowed because it is dangerous.
- Forcedly issue a signal for discharging an N2 gas.

The forced operation is not limited to the above-described operation and can include all kinds of operation performed at the PLC. It is therefore possible to perform a number of other kinds of forced operation. According to one example, the apparatus is confirmed before shipment by executing all the forced operation once before the apparatus is delivered. According to one example, operation of all kinds of equipment to be controlled by a transfer module controller (TMC), that is, a transfer system is confirmed through the forced operation. By this means, it is possible to easily confirm that the apparatus normally operates before the apparatus is delivered to a client. Note that such operation could not be performed unless complicated procedures had been performed in related art.

By the way, for example, in the semiconductor manufacturing apparatus, various interlocks are set by the safety PLC. According to one example, it is possible to confirm whether the interlocks normally function with the diagnostic tool 10.

An INTERLOCK button is provided in an upper left part of the configuration screen in FIG. 5. By the user depressing the INTERLOCK button, an interlock display screen in FIG. 8 can be displayed at the HMI 22. According to another example, by operating the HMI 22, states of the interlocks of the equipment connected to the PLC can be displayed at the HMI 22.

Figure 8:
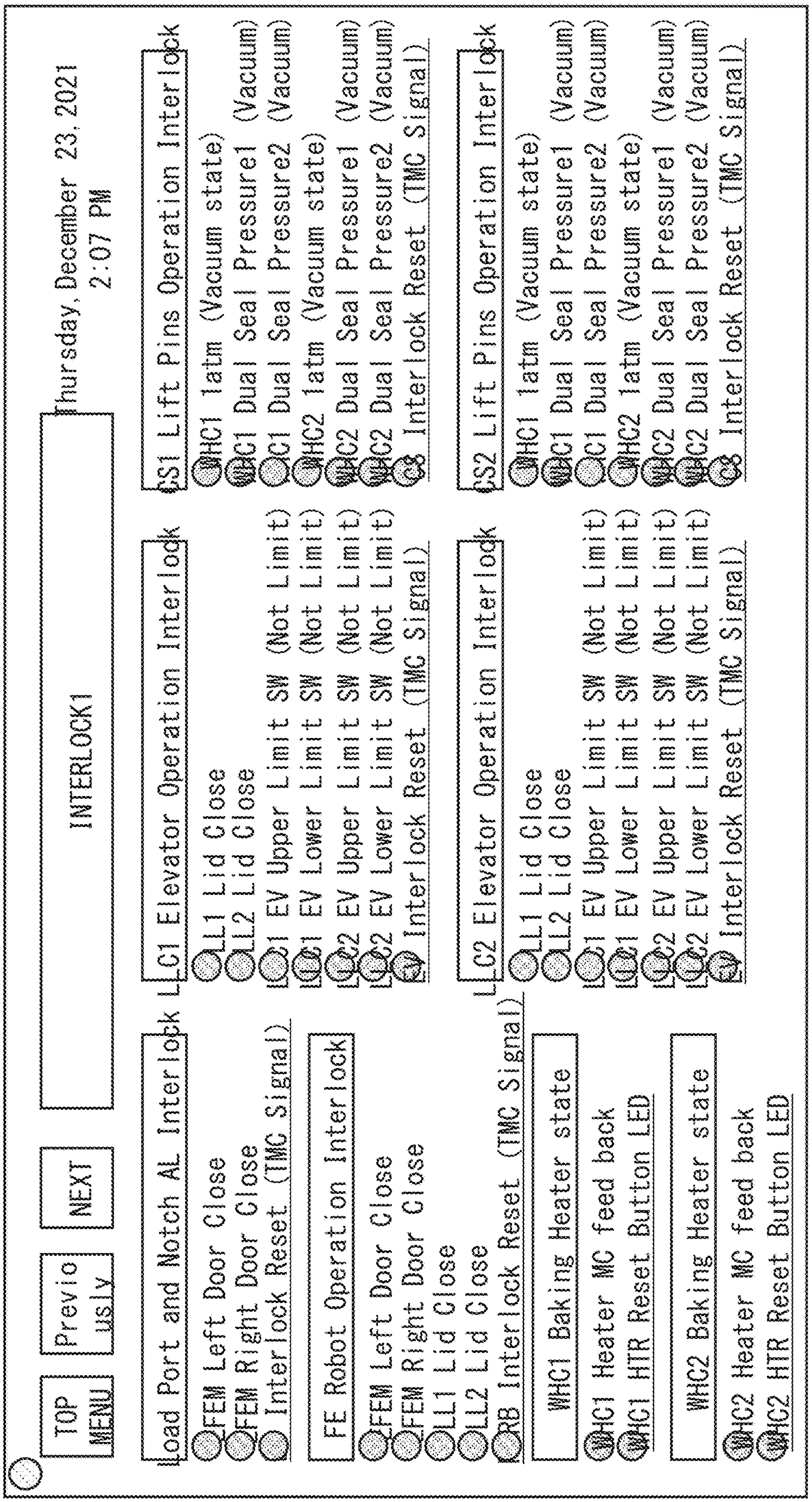
FIG. 8 shows interlock display screen.

It can be said that the interlock display screen in FIG. 8 is a screen in which signals displayed in FIGS. 5 to 7 are collected for each interlock. A list of signals to be used in one interlock is displayed in the interlock display screen in FIG. 8. For example, in a unit of FE Robot Operation Interlock, conditions for allowing operation of a front-end robot are collected. Specifically, the operation of the front-end robot is allowed if all conditions of EFEM Left Door Close, EFEM Right Door Close, LL1 Lid Close and LL2 Lid Close are satisfied. In the example in FIG. 8, red buttons are lighted in all the interlocks, and thus, all the equipment is in an interlocked state and cannot be operated. On the other hand, when green buttons are displayed, the equipment can be operated. In this manner, whether or not the interlocks normally function can be displayed at the HMI 22. According to one example, there are often a number of interlocks, and thus, the interlock display screen may include, for example, 30 or more pages.

Figure 9:
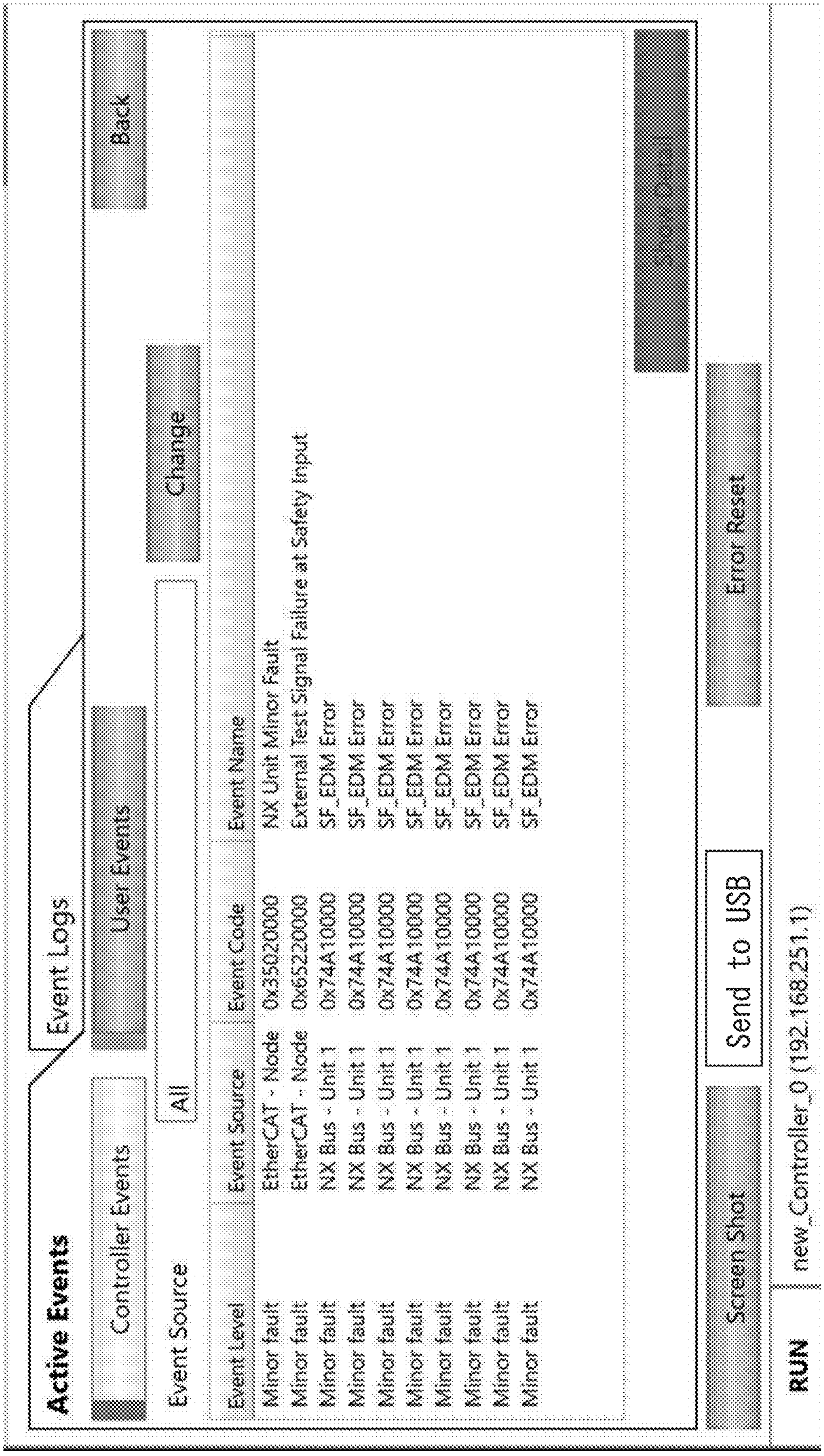
FIG. 9 is a view illustrating an example of an alarm list display screen.

The configuration screen in FIG. 5 includes a button displayed as ALM. According to one example, by displaying the ALM button in red in a case where an alarm is issued, the user can be notified of issuance of the alarm. By the user depressing the ALM button, an alarm list issued from the PLC can be displayed at the HMI 22. FIG. 9 is a view illustrating an example of an alarm list display screen. It can be seen from this alarm list that 10 Minor Faults occur. According to one example, a "Screen Shot" button and a "Send to USB" button can be provided on the alarm list display screen. When the user depresses the Screen Shot button, a screen shot is to be stored in a memory of the diagnostic tool 10. When the user depresses the Send to USB button, the alarm list is stored in the USB memory connected to the USB port 18.

Figure 10:
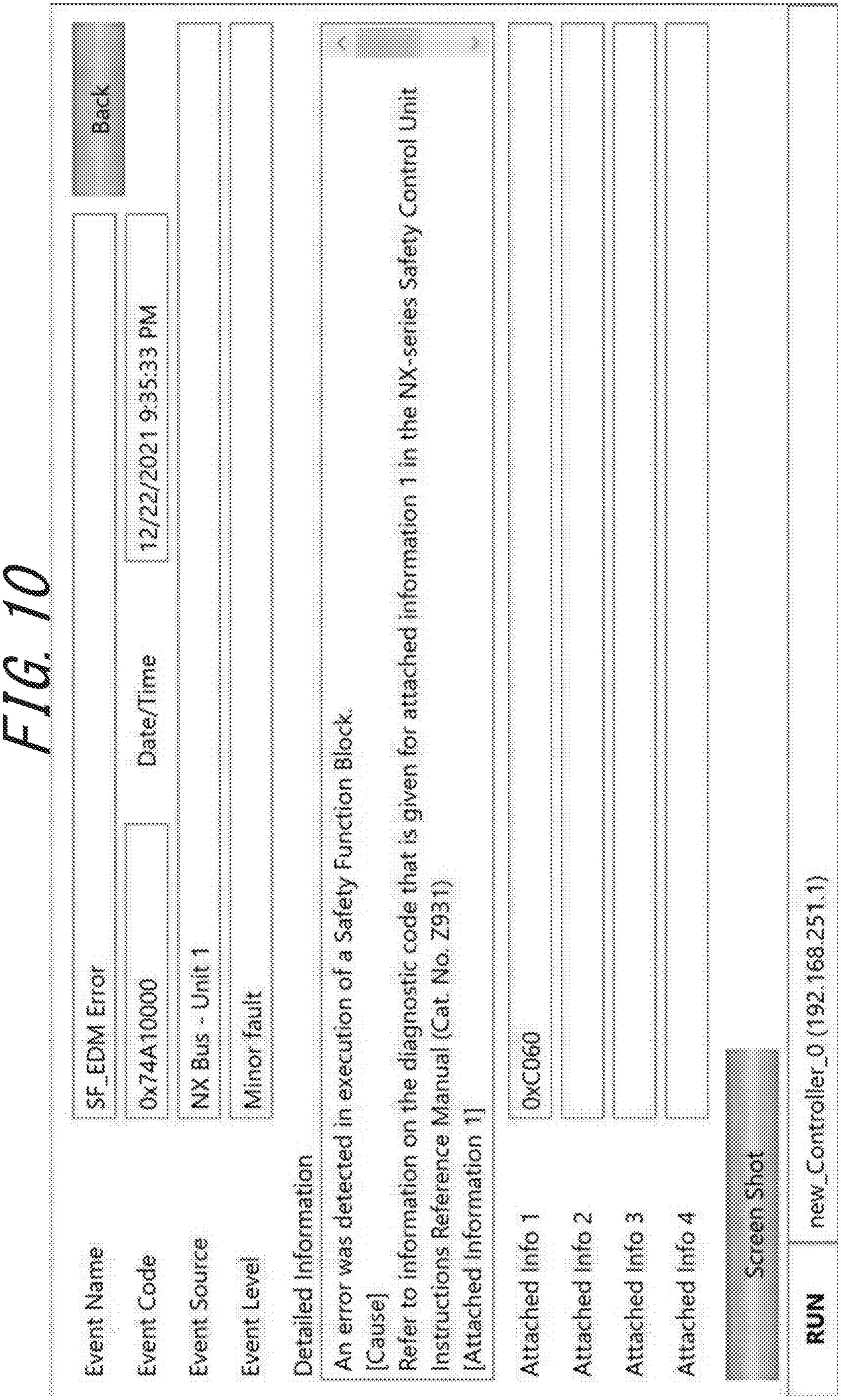
FIG. 10 is a view illustrating an example of the alarm detailed screen.

If the user touches one of the alarms displayed on the alarm list display screen and depresses a show detail button, the screen transitions to a detailed screen of the alarm. FIG. 10 is a view illustrating an example of the alarm detailed screen. In this manner, by selecting an alarm displayed in the alarm list, details of the alarm can be displayed at the HMI 22. The diagnostic tool 10 is configured to cause the HMI to display details of the alarm of the PLC.

As described above, it is possible to grasp an internal state of the apparatus, forcedly operate the apparatus and confirm a list and details of alarms using the diagnostic tool 10. Further, the diagnostic tool 10 does not have a wireless function and can be regarded as part of the apparatus including the PLC. Thus, also in a case where a note PC is not permitted to be brought into a customer's factory for security reasons, this diagnostic tool 10 can be brought into the customer's factory. For example, it is often the case that security requirements required at customer's factories may be satisfied by configuring the diagnostic tool 10 to be able to give and receive data to and from the user only via the LAN port and the USB port. Further, the above-described respective kinds of operation can be performed simply and intuitively using the HMI typified by a touch panel. Thus, even a person who does not acquaint himself/herself with a method for operating PLC development software can use the diagnostic tool 10. For example, even in a case where an alarmed problem cannot be solved only by persons in a customer's factory, by storing details of the alarm in a USB memory, it is possible to easily seek advice from engineers outside the customer's factory.

According to one example, the diagnostic tool 10 includes a processing circuitry for performing all or at least a part of the above functions. In one example, the processing circuitry can perform at least the forced operations described above. The processing circuitry may be dedicated hardware, or may be a CPU (also referred to as Central Processing Unit, central processor unit, processing unit, arithmetic unit, microprocessor, microcomputer, processor or DSP) that executes a program which is stored in a memory.

Figure 11:
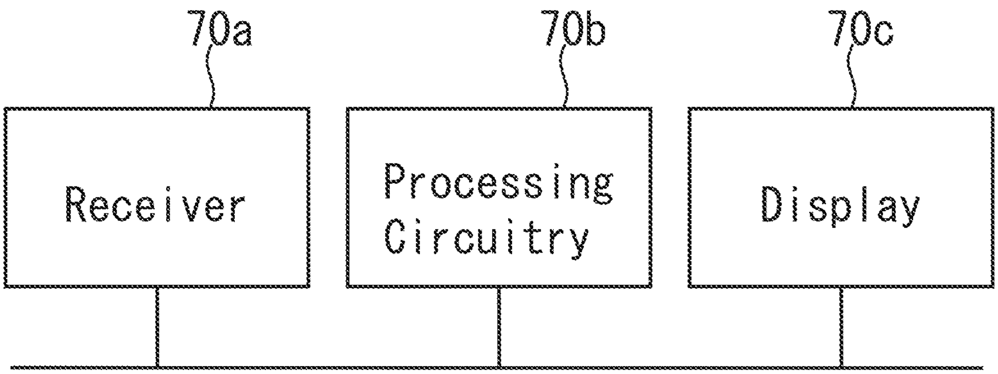
FIG. 11 is a block diagram of the HMI in a case where the processing circuitry is dedicated hardware.

FIG. 11 is a block diagram of the HMI 22 in a case where the processing circuitry **70*b* is dedicated hardware. The HMI 22 includes a receiver 70*a*, processing circuitry 70*b*, and an output device 70*c*. The receiver 70*a* receives data from the PLC. The processing circuitry 70*b* corresponds to, for example, single circuitry, composite circuitry, a programmed processor, a parallel programmed processor, an ASIC, an FPGA, or a combination thereof. The functions of the diagnostic tool 10 may be realized by the respective pieces of processing circuitry, or the functions may be collectively realized by the processing circuitry. According to one example, the processing circuitry functions as a controller that controls the forced operations. The output device 70*c* may be the touch panel. In this case, the output device 70*c*** also functions as a input device for receiving instructions from user.

Figure 12:
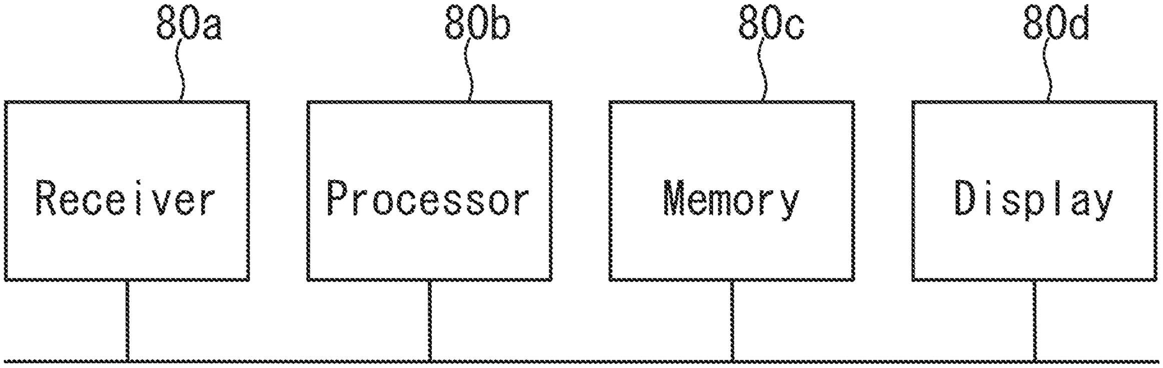
FIG. 12 is a block diagram illustrating a configuration example of the HMI in a case where processing circuitry is a CPU.

FIG. 12 is a block diagram illustrating a configuration example of the HMI 22 in a case where processing circuitry is a CPU. In this case, the above series of processes is controlled by a program. For example, a procedure for the forced operations starts automatically. When the processing circuitry **80*b* is a CPU as illustrated in FIG. 12, each function of the diagnosis tool is realized by software, firmware, or a combination of software and firmware. The software or the firmware is described as a program, and is stored in a computer-readable storage medium 80*c***. In one example, this program causes a computer to display an internal state of an apparatus, display a list of the alarm, display the details of the alarm, and execute forced operations. In another example, this program causes a computer to transmit a command issued from the HMI by a user to a connection destination of the LAN port.

The invention claimed is:

1. A diagnostic tool comprising:

a LAN port;

a human-machine interface (HMI) comprising a touch panel, wherein an upper region of the touch panel comprises a button that is enabled at the upper region of the touch panel and invisible to a user, and wherein the button is configured to cause the touch panel, based on user input associated with the button, to display a forced operation screen for forcedly operating a programmable logic controller (PLC) or equipment connected to the PLC;

a mounting board configured to connect to the LAN port and the HMI, wherein a lower portion of the HMI is connected to the mounting board, and wherein an upper portion of the HMI is configured to be adjustable from a first position in which the upper portion is at a first angle relative to the mounting board to a second position in which the upper portion is at a second angle relative to the mounting board, wherein the second angle is greater than the first angle; and a Central Processing Unit (CPU) configured to transmit a command issued from the HMI by the user to a connection destination of the LAN port, wherein the diagnostic tool is configured to be incapable of wireless communication.

2. The diagnostic tool according to claim 1, wherein the HMI further comprises a mouse and a keyboard.

3. The diagnostic tool according to claim 1, further comprising an attaché case configured to accommodate the mounting board and in which the LAN port, the HMI and the CPU are accommodated via the mounting board.

4. The diagnostic tool according to claim 1, further comprising a USB port configured to store data displayed at the HMI in an external memory.

5. The diagnostic tool according to claim 1, further comprising an IEC connector for power supply, and an AC-DC conversion circuit configured to support an input voltage from 85 to 265 V.

6. The diagnostic tool according to claim 1, wherein the diagnostic tool causes the touch panel of the HMI to display an internal state of the PLC connected to the LAN port.

7. The diagnostic tool according to claim 1, wherein the diagnostic tool causes the touch panel of the HMI to display details of an alarm of the PLC.

8. The diagnostic tool according to claim 4, wherein data is given and received only via the LAN port and the USB port.

9. The diagnostic tool according to claim 1, wherein the connection destination of the LAN port is connected to the PLC, and wherein the CPU causes the diagnostic tool to perform:

causing the touch panel of the HMI to display an internal state of the PLC; and based on the user input to the button that is enabled at the upper region of the touch panel and invisible to the user, causing display of a screen for forcedly operating the PLC or the equipment connected to the PLC.

* * * * *